Figure 5:
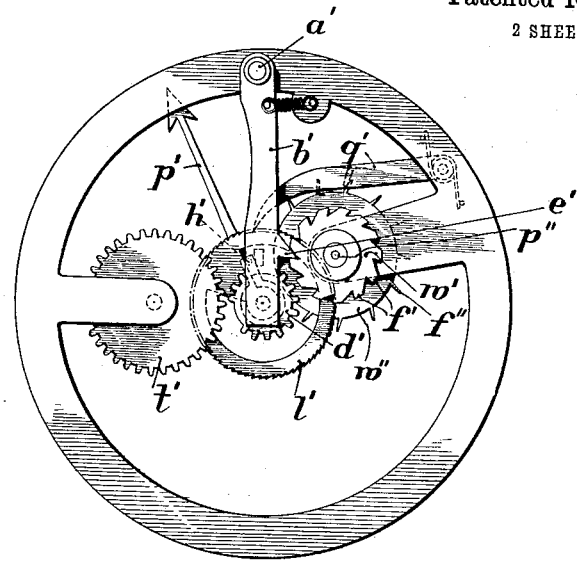

H. HORNIG.
SPEEDOMETER.
APPLICATION FILED FEB. 27, 1914.
1,116,282.
Patented Nov. 3, 1914.
2 SHEETS—SHEET 1.
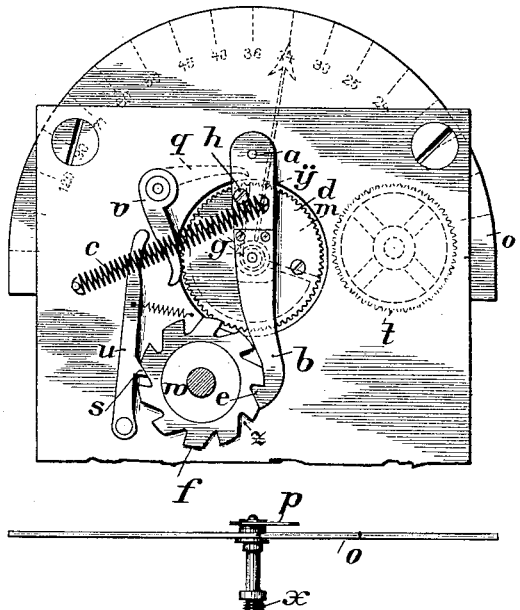
Fig. 1
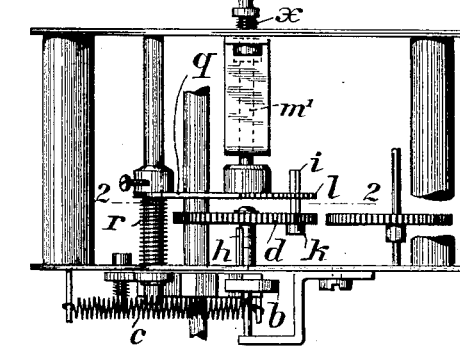
Fig. 2
Fig. 4
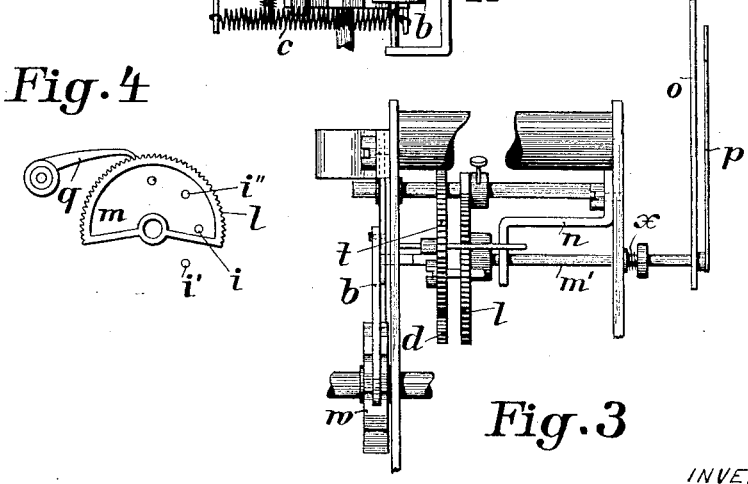
Fig. 3
WITNESSES
L. H. Grote
M. E. Kier
INVENTOR
HEINRICH HORNIG
BY Howson and Howson
ATTORNEYS
THE NORRIS PETERS CO., PHOTO-LITHO., WASHINGTON, D. C.

H. HORNIG.
SPEEDOMETER.
APPLICATION FILED FEB. 27, 1914.

1,116,282.

Patented Nov. 3, 1914.
2 SHEETS—SHEET 2.

WITNESSES
L. H. Grote
M. G. Keir

INVENTOR
HEINRICH HORNIG
BY Howson and Howson
ATTORNEYS

UNITED STATES PATENT OFFICE.

HEINRICH HORNIG, OF MAHLSDORF, NEAR BERLIN, GERMANY.

SPEEDOMETER.

1,116,282.      Specification of Letters Patent.      Patented Nov. 3, 1914.

Application filed February 27, 1914. Serial No. 821,483.

*To all whom it may concern:*

Be it known that I, HEINRICH HORNIG, a subject of the King of Prussia, residing at Mahlsdorf, near Berlin, Germany, have invented a certain new and Improved Speedometer, of which the following is a specification.

The present invention relates to speedometers and particularly to apparatus of this character for ascertaining the speed of motor cars and the like, by simultaneous measurement of time and travel units. Whereas in known apparatus of this type the distance traveled in a predetermined period of time, is transmitted to an indicator by means of a member driven synchronously with a rotary element of the vehicle, the present invention provides a time measurement for predetermined like units of travel distance. Inasmuch as this time period is inversely proportional to the speed of travel, it affords ready means for indicating travel speed.

The choice of travel units as the basis of measurement, has the characteristic that the operation of the mechanism through which the speed indication is obtained, results from the actual travel of the vehicle and obviously operates the more rapidly as the speed increases. Inasmuch as in the present arrangement, the indicator is actuated not by the travel element which rotates at various speeds, but with the time element which rotates at predetermined constant speed and with which the indicator is temporarily brought into operative relation, any inaccuracy or defect which may exist in the coupling between the time element and the indicator (as a result of defective construction of the drive or of the coupling gear) remains the same for all indications and may thus be readily compensated for. In this way the accuracy of the speedometer may be made very great.

Should the device for coupling the time element to the travel element and also the device for holding the indicator in the position to which it is moved, be controlled from a single element, a predetermined accurate relationship in the sequence and duration of their operation is assured. This relationship is customarily established by the insertion of a suitable device in the drive of one or other of the elements to insure the desired sequence. In order to secure this operation, a special construction is employed, according to the present invention, by which the coupling of the measuring drive and the operation of the indicator holding device are both controlled from an element which also controls the duration of the measuring drive, and thus insures an harmonious coöperation of the parts.

Figure 6:
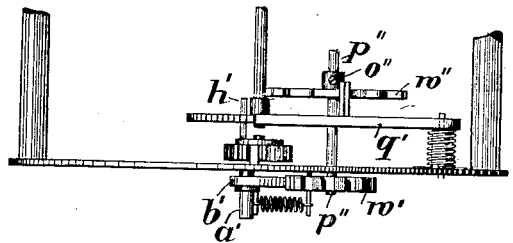
Figure 7:
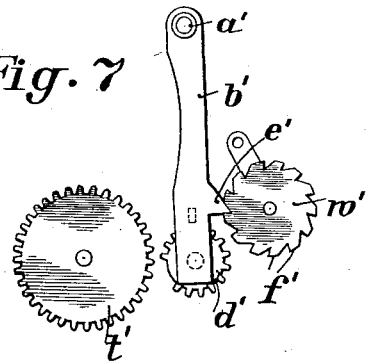
Figure 8:
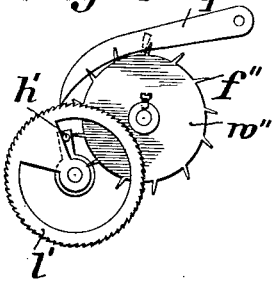

In the accompanying more or less diagrammatic drawings, Figure 1 is a rear elevation of a speedometer in which my invention is embodied in one form, certain portions of the device being omitted for the sake of clarity; Fig. 2 is a plan view of the same; Fig. 3 is a side elevation of the same; Fig. 4 is an elevation of a detail, (viewed from the line 2—2, Fig. 2); Fig. 5 is an elevation of the actuating mechanism of a second form of speedometer; Fig. 6 is a plan view of Fig. 5; Figs. 7 and 8 are elevations of details of this mechanism.

Referring first to the form of construction shown in Figs. 1 to 4, the present speedometer comprises a travel element $w$ in the form of a wheel, driven from a rotary element (not shown) of the vehicle or the like the speed of which is to be measured and which has a speed in direct ratio to the speed of the vehicle or the like. This driving connection (not shown) of the wheel $w$ is so arranged that it is constantly rotated in the same direction, irrespective of the direction of travel of the vehicle *i. e.* either forward or backward. The driving connection may be so predetermined that the wheel $w$ makes a single revolution for a given distance of travel, *e. g.* once for a kilometer. If the periphery of the wheel is divided into ten equal sections $f$ by the notches $z$ each section represents a travel unit of one hundred meters. The wheel $t$, which constitutes the time element of the speedometer, is driven by clockwork (not shown) and consequently rotates at predetermined constant speed. Between these distance and time elements $w$ and $t$, is arranged the driving mechanism for the measuring device. This comprises a swinging arm $b$ pivoted at $a$, which is constantly drawn against the periphery of the wheel $w$ by the spring $c$. A gear wheel $d$ is mounted on a pin on the bar $b$ in such position that when the pawl $e$ rides upon one of the peripheral sections $f$ of the wheel $w$, the gear $d$ meshes with the geared periphery of the time wheel $t$ and is driven by the latter in the direction of the arrow Fig. 1 or clockwise.

The moment the pawl $e$ of the bar $b$ falls into one of the notches $z$ of the wheel $w$, the engagement between gears $d$ and $t$ is broken and the gear $d$ is rotated back to original position by the spring $g$ which is coiled on the hub of the wheel $d$ with one end bearing against the pin $h$ on the arm $b$ and the other against a pin on the wheel $d$ so that on the rotation of the latter by the gear $t$ the spring is put under tension. The original position of the wheel $d$ is determined by the impingement of the head $k$ of the pin $i$ against the pin $h$ on the arm $b$.

The operation is as follows: So long as the pawl $e$ of the arm $b$ rides over one of the travel unit sections $f$ of the wheel $w$, the gear wheel $d$ of the time element is driven by $t$. As soon as the pawl $e$ drops into a notch $z$, the wheels $d$ and $t$ become disengaged and the wheel $d$ returns at once to original position. The angular extent through which the gear $d$ is driven by the gear $t$, is proportional to time consumed by the car in traveling one hundred meters. This angular movement of the wheel $d$ is transferred to the indicator by the pin $i$.

The indicator comprises a skeleton sector $l$ mounted on the spindle $m'$ (Fig. 4) and engaged at one side by the pin $i$ working within the frame of the sector. An indicator $p$ fast on the spindle $m'$, is moved over the scale $o$ on the rotation of the sector. In order to prevent the indicator from returning to the zero point at once with the gear $d$ the sector is provided with a peripheral ratchet which is engaged by the pawl $q$ pressed against the ratchet teeth by the spring $r$ and thus preventing the sector from following the pin $i$ on its return movement with the gear $d$.

Should the time consumed during the travel of the next one hundred meters by the car, be greater than that required for the first one hundred meters, then the sector is again engaged by the pin $i$ and rotated farther, for example until the pin has reached its end position at $i'$. Unless the pin $i$ passes beyond its previous end position (viz. $i$, Fig. 4) the sector has no further forward movement nor is it possible for it to have a return movement.

To permit the sector to rotate backward, the engagement of the pawl $q$ with the ratchet periphery of the sector is broken momentarily before the gear $d$ is freed from gear $t$. The interruption of this engagement is accomplished through the arm $n$, the pawl $s$ on which engages the notches $z$ in the wheel $w$ slightly in advance of the engagement between the pawl $e$ on the arm $b$, and as it enters the notch $z$ it engages the lever $u$ fast on the spindle of the pawl $q$ and lifts the latter from the ratchet. The sector $l$ is thus momentarily freed and rotates backward under the influence of the spring $x$ until it engages the pin $i$ which may now have the position $i''$. Before the pawl $e$ has left its notch $z$, the pawl $s$ must have moved sufficiently out of its notch $z$ to permit the pawl $q$ to fall into engagement with the ratchet on the sector $l$ so that the indicator $p$ is held in the proper indicating position to which it has been carried by the pin $i$.

The gearing of the clockwork (not shown) by which the gear $t$ is driven, is selected to insure the travel of the indicator $p$ through a predetermined angle, e. g. 180°, in twenty seconds. The seconds are marked on the dial $o$. Supposing a distance of one hundred meters is traveled in three seconds, which represents a speed of one hundred and twenty kilometers in an hour, the indicator hand $p$ travels (from left to right, Fig. 1) over only three sections of the dial $o$. Should six seconds be consumed in traveling the same distance (thus at a speed of sixty kilometers in an hour), the hand $p$ moves over six of the second sections and reaches the 60 mark on the dial. Should the car travel less than one hundred meters and then stop, the indicator hand $p$ is slowly rotated to the right to the zero point of the dial by the clockwork. The teeth on the gear $d$ are cut away however at this point ($y$ in Fig. 1) so that the continued rotation of the gear $t$ has no further effect upon gear $d$ and the hand $p$ remains at the zero point. Obviously the gearing and ratios may be altered to suit any particular needs and those mentioned are to be regarded as merely an exemplification of the invention. Thus instead of 100 meters and 20 seconds, the wheel $w$ might rotate once every 50 meters and the hand $p$ move across the dial face in 10 seconds, or otherwise.

In the modification shown in Figs. 5 to 8, the pawl $q'$ of the indicator mechanism, is not controlled by the wheel $w'$ but from a star wheel $w''$ fast on the spindle of the wheel $w'$ and provided with fine teeth $f''$ equal in number and arranged in predetermined relation to the teeth $f'$ of the wheel $w'$. By reason of the sharpness of these teeth $f''$, the pawl $q'$ is disengaged from the ratchet teeth on the skeleton wheel $l'$ only for a very brief period. The freeing of the pawl $q'$ can thus be timed very close to the moment at which the engagement between the gears $d'$ and $t'$ is broken. This avoids the unnecessary back and forth angular movement of the dial hand $p'$, which cannot be avoided when the control of the pawl $q'$ is effected through the notches in the wheel $w'$. In order to regulate the precise moment at which the teeth of the wheel $w''$ act upon the pawl $q'$, the wheel $w''$ may be adjustably mounted on the spindle $p''$ of the wheel $w'$ by means of a set screw $o''$.

Various other modifications of the construction will readily suggest themselves.

I claim as my invention:—

1. A speed indicator of the character described comprising a time element moving at predetermined constant speed, an indicator element adapted to be driven thereby, and a travel element moving at the speed to be measured, and means in connection with the latter for insuring operative connection between said time and indicator elements only during the passage of said travel element over a predetermined travel unit.

2. A speed indicator of the character described comprising a time element rotating at constant speed, a travel element rotating with the travel of the object the speed of which is to be measured, a movable indicator, gearing for operatively connecting said indicator to the time element and means controlled by the rotary travel element for establishing said operative connection during a predetermined extent of travel.

3. A speed indicator of the character described comprising a time element rotating at constant speed, a travel element rotating with the travel of the object the speed of which is to be measured, a movable indicator, gearing for operatively connecting said indicator to the time element, a pivoted member carrying the gearing element for said indicator, and means controlled by the rotary travel element for swinging said pivoted member on its axis to bring the indicator gearing into operative connection with the gearing of the rotary time element during a predetermined extent of travel.

4. A speed indicator of the character described, comprising a time element rotating at constant speed, a travel element rotating with the travel of the object the speed of which is to be measured, a movable indicator, a gear on the rotary time element, a coöperating gear operatively connected to the indicator, a pivoted member carrying said indicator gear, a spring tending to move said coöperating gears out of mesh and means controlled by the rotary travel element for swinging said pivoted member on its axis to bring the indicator gear into mesh with the time element gear during a predetermined extent of travel.

5. A speed indicator of the character described, comprising a time element rotating at constant speed, a travel element comprising a disk with peripheral notches spaced predetermined distances apart and rotating with the travel of the object the speed of which is to be measured, a movable indicator, a gear on the rotary time element, a coöperating gear operatively connected to the indicator, a pivoted member carrying said gear and bearing against the notched periphery of the said disk, the parts being so correlated that the said gears are brought into mesh during the passage of said pivoted member over the spaces between the notches in said periphery and the engagement broken by its entry into the notches, for the purpose described.

6. A speed indicator of the character described and comprising a time element rotating at constant speed, a travel element rotating with the travel of the object the speed of which is to be measured, a movable indicator, gearing for operatively connecting said indicator to the time element and means controlled by the rotary travel element for establishing said operative connection during a predetermined extent of travel, in combination with a ratchet mechanism for holding the indicator in the position to which it is moved during said operation engagement and means governed by the travel element for temporarily freeing said ratchet after a predetermined extent of travel of the travel element.

7. A speed indicator of the character described and comprising a time element rotating at constant speed, a travel element rotating with the travel of the object the speed of which is to be measured, a movable indicator, gearing for operatively connecting said indicator to the time element and means controlled by the rotary travel element for establishing said operative connection during a predetermined extent of travel, in combination with a ratchet mechanism for holding the indicator in the position to which it is moved during said operation engagement and means governed by the travel element for temporarily freeing said ratchet in advance of the completion of a travel unit the speed of which is about to be measured.

In testimony whereof I have signed my name to this specification, in the presence of two subscribing witnesses.

HEINRICH HORNIG.

Witnesses:
 HENRY HASPER,
 RICHARD GOEB.